United States Patent
Kostecka et al.

(10) Patent No.: US 9,778,433 B2
(45) Date of Patent: Oct. 3, 2017

(54) SPLICE MODULE FOR FIBER BLADE

(71) Applicants: ADC Telecommunications, Inc., Berwyn, PA (US); Tyco Electronics UK Infrastructure Limited, Swindon (GB)

(72) Inventors: Ryan Kostecka, Waconia, MN (US); Alan Cook, Liverpool (GB); David Thomas, Chester (GB)

(73) Assignees: CommScope Technologies LLC, Hickory, NC (US); CommScope Connectivity UK Limited (GB)

( * ) Notice: Subject to any disclaimer, the term of this patent is extended or adjusted under 35 U.S.C. 154(b) by 0 days.

(21) Appl. No.: 14/924,365

(22) Filed: Oct. 27, 2015

(65) Prior Publication Data

US 2016/0116697 A1    Apr. 28, 2016

Related U.S. Application Data

(60) Provisional application No. 62/069,079, filed on Oct. 27, 2014.

(51) Int. Cl.
*G02B 6/44* (2006.01)
*G02B 6/38* (2006.01)

(52) U.S. Cl.
CPC ......... *G02B 6/4454* (2013.01); *G02B 6/4455* (2013.01); *G02B 6/3897* (2013.01); *G02B 6/4471* (2013.01)

(58) Field of Classification Search
CPC .. G92B 6/4454; G92B 6/4455; G02B 6/4454; G02B 6/4455; G02B 6/3897; G02B 6/4471
See application file for complete search history.

(56) References Cited

U.S. PATENT DOCUMENTS

| | | | | | |
|---|---|---|---|---|---|
| 4,861,134 | A | * | 8/1989 | Alameel | G02B 6/4246 250/227.24 |
| 4,881,792 | A | * | 11/1989 | Alameel | G02B 6/3897 385/56 |
| 5,325,455 | A | * | 6/1994 | Henson | G02B 6/3817 385/137 |
| 5,420,958 | A | * | 5/1995 | Henson | G02B 6/3806 385/135 |
| 5,613,030 | A | * | 3/1997 | Hoffer | G02B 6/4452 385/135 |
| 6,549,710 | B2 | * | 4/2003 | Simmons | G02B 6/3668 385/114 |

(Continued)

OTHER PUBLICATIONS

International Search Report and Written Opinion for Application No. PCT/EP2015/074814 mailed Feb. 4, 2016.

*Primary Examiner* — Peter Radkowski

(74) *Attorney, Agent, or Firm* — Merchant & Gould P.C.

(57) ABSTRACT

A blade arrangement for use in a bladed chassis system includes a splice module coupled to a blade. The splice module includes a splice region, a storage region, a first enter/exit region at the first side, and a second enter/exit region at the second side. Either of the enter/exit regions can be faced towards a rear of the blade when the splice module is mounted to the blade. The splice allows unterminated optical cables routed to the rear of the blade to be optically spliced to connectorized pigtails that are received at rear ports of optical adapters on the blade.

19 Claims, 15 Drawing Sheets

(56) References Cited

U.S. PATENT DOCUMENTS

| | | | | |
|---|---|---|---|---|
| 6,556,754 B2* | 4/2003 | Shoemaker | G02B 6/3668 | 385/114 |
| 6,655,848 B2* | 12/2003 | Simmons | G02B 6/3636 | 385/56 |
| 6,760,530 B1* | 7/2004 | Mandry | G02B 6/4471 | 385/135 |
| 6,816,642 B1* | 11/2004 | Mayer | G02B 6/4246 | 385/24 |
| 6,832,032 B2* | 12/2004 | Simmons | G02B 6/3668 | 385/115 |
| 6,847,774 B2* | 1/2005 | Simmons | G02B 6/3636 | 385/121 |
| 6,850,684 B2* | 2/2005 | Simmons | G02B 6/3636 | 385/134 |
| 6,980,725 B1* | 12/2005 | Swieconek | G02B 6/4452 | 385/135 |
| 6,986,607 B2* | 1/2006 | Roth | G02B 6/3849 | 385/55 |
| 7,020,359 B2* | 3/2006 | Mayer | G02B 6/4246 | 385/24 |
| 7,139,452 B2* | 11/2006 | Mayer | G02B 6/4246 | 385/14 |
| 7,331,717 B2* | 2/2008 | Kiani | G02B 6/3897 | 385/53 |
| 7,597,483 B2* | 10/2009 | Simmons | G02B 6/3636 | 385/56 |
| 7,756,371 B1* | 7/2010 | Burnham | G02B 6/4472 | 385/15 |
| 7,974,105 B2* | 7/2011 | Dean, Jr. | G02B 6/4459 | 361/826 |
| 8,411,465 B2* | 4/2013 | Dean, Jr. | G02B 6/4459 | 361/825 |
| 8,437,147 B2* | 5/2013 | Dean, Jr. | G02B 6/4459 | 174/72 R |
| 8,702,318 B2* | 4/2014 | Isenhour | G02B 6/3849 | 385/60 |
| 8,923,013 B2 | 12/2014 | Anderson et al. | | |
| 8,934,252 B2 | 1/2015 | Anderson et al. | | |
| 8,934,253 B2 | 1/2015 | Anderson et al. | | |
| 9,020,319 B2 | 4/2015 | Anderson et al. | | |
| 9,198,320 B2 | 11/2015 | Anderson et al. | | |
| 9,213,363 B2 | 12/2015 | Anderson et al. | | |
| 9,223,105 B2 | 12/2015 | Anderson et al. | | |
| 9,265,172 B2 | 2/2016 | Anderson et al. | | |
| 2003/0031419 A1* | 2/2003 | Simmons | G02B 6/3636 | 385/56 |
| 2003/0031420 A1* | 2/2003 | Simmons | G02B 6/3636 | 385/56 |
| 2003/0031436 A1* | 2/2003 | Simmons | G02B 6/3668 | 385/121 |
| 2003/0031437 A1* | 2/2003 | Simmons | G02B 6/3668 | 385/121 |
| 2003/0031448 A1* | 2/2003 | Simmons | G02B 6/3636 | 385/134 |
| 2003/0031449 A1* | 2/2003 | Simmons | G02B 6/3636 | 385/134 |
| 2003/0031452 A1* | 2/2003 | Simmons | G02B 6/3668 | 385/147 |
| 2005/0053337 A1* | 3/2005 | Mayer | G02B 6/4246 | 385/89 |
| 2005/0069262 A1* | 3/2005 | Roth | G02B 6/3849 | 385/55 |
| 2006/0002659 A1* | 1/2006 | Kiani | G02B 6/3897 | 385/53 |
| 2006/0177175 A1* | 8/2006 | Mayer | G02B 6/4246 | 385/24 |
| 2009/0273915 A1* | 11/2009 | Dean, Jr. | G02B 6/4459 | 361/826 |
| 2010/0158465 A1* | 6/2010 | Smrha | G02B 6/4453 | 385/135 |
| 2010/0195955 A1* | 8/2010 | Burnham | G02B 6/4472 | 385/24 |
| 2011/0211328 A1* | 9/2011 | Dean, Jr. | G02B 6/4459 | 361/826 |
| 2011/0211329 A1* | 9/2011 | Dean, Jr. | G02B 6/4459 | 361/826 |
| 2013/0163218 A1 | 6/2013 | Kostecka | | |
| 2013/0287357 A1 | 10/2013 | Solheid et al. | | |
| 2013/0308908 A1* | 11/2013 | Isenhour | G02B 6/3849 | 385/61 |
| 2013/0315549 A1 | 11/2013 | Rudenick et al. | | |
| 2014/0029907 A1* | 1/2014 | Isenhour | G02B 6/3849 | 385/135 |
| 2014/0037251 A1* | 2/2014 | Isenhour | G02B 6/3849 | 385/79 |

\* cited by examiner

SPLICE MODULE FOR FIBER BLADE

CROSS-REFERENCE PARAGRAPH

This application claims the benefit of U.S. Patent Application No. 62/069,079, filed Oct. 27, 2014, titled "Splice Module for fiber Blade," the disclosure of which is hereby incorporated herein by reference.

BACKGROUND

In communications infrastructure installations, a variety of communications devices can be used for switching and connecting communications signal transmission paths in a communications network. Some such communications devices are installed in one or more equipment racks to permit organized, high-density installations to be achieved in limited space available for equipment.

Installing a large number of connections in an equipment rack is efficient with respect to floor space, but places a premium on the ability to manage and maintain the communications cables leading to and away from these equipment racks. Further, due to the increasing demand for communications system capacity, it is desirable to increase the density of connections within a given space that can be achieved.

Improvements are desired.

SUMMARY

In accordance with some aspects of the disclosure, a blade arrangement for use in a bladed chassis system includes a blade and a fiber module. The blade includes a panel extending between a front and a rear and between a first side and an opposite second side. The blade includes optical adapters disposed on the panel. Each of the optical adapters has a front-facing port and a rear-facing port. The blade also includes a retention arrangement having a stop member resiliently movable relative to the panel. The fiber module is coupled to the blade. The fiber module includes a splice region, a storage region, a first enter/exit region at a first side, and a second enter/exit region at a second side. The first and second enter/exit regions are aligned along a fiber routing axis that extends between the first and second sides of the fiber module.

In certain implementations, the fiber module is symmetrical about a dividing axis that extends between the first and second ends of the optical splice module.

In certain implementations, the fiber module is mountable to the panel without using tools. For example, the fiber module can be configured to snap onto the panel.

In certain implementations, the fiber module is shaped and configured selectively mount to the blade at the first location or a second location. The first location is disposed between the first side of the panel and a central part of the panel. The second location is disposed between the second side of the panel and the central part of the panel. In example, the fiber module is positioned in a first orientation when mounted at the first location and is positioned in a second orientation when mounted at the second location. The second orientation is rotated by about 180° compared to the first orientation.

In certain examples, a first fiber module is disposed at the first location and a second fiber module is disposed at the second location. The first and second fiber modules are identically structured. The first module is disposed in the first orientation and the second module is disposed in the second orientation. In an example, the first and second orientations are opposite each other.

In certain examples, the first enter/exit region is defined by a first platform and the second enter/exit region is defined by a second platform. One of the first and second platforms is retained by the blade. The second platform is not retained by the blade when the first platform is retained by the blade. The first platform is not retained by the blade when the second platform is retained by the blade.

In certain implementations, the blade defines a cable tie location including mounting members extending upwardly from the panel. Each mounting members defines an opening. In some examples, each platform of the fiber module has outwardly extending latching tabs that are sized and shaped to snap into the openings defined by the mounting members when the platform is retained by the blade. In other examples, each platform includes two latching arms having deflectable distal ends that are sized and shaped to snap into the openings defined by the mounting members when the platform is retained by the blade.

In certain implementations, each of the first and second enter/exit regions includes an outwardly extending section below which a securement member can extend to secure a cable to the fiber module.

In certain implementations, optical fiber pigtails having first connectorized ends received at the rear-facing ports of the optical adapters. The optical fiber pigtails have second unconnectorized ends received at the fiber module.

In certain implementations, the splice region and the storage region are disposed along the dividing axis.

In certain examples, a first routing channel extend between the splice region and the first enter enter/exit region; and a second routing channel extends between the splice region and the second enter/exit region.

In certain examples, the splice region and the storage region are disposed on a raised platform that extends along the dividing axis. In an example, guide members extend downwardly from the raised platform.

In certain implementations, the fiber module is configured to be taped to the blade.

In certain implementations, a cover is configured to removably couple to the fiber module to cover the splice region and storage region.

In accordance with other aspects of the disclosure, a fiber module including a tray, a first splice chip disposed on the tray, a first spool arrangement disposed on the tray, a second splice chip disposed on the tray, a second spool arrangement disposed on the tray, and a cover that extends over the tray to close the interior. The tray includes a base and a sidewall. The sidewall extends upwardly from a top of the base. The sidewall is interrupted along portions of the first and second sides of the tray to define first and second enter/exit regions, respectively. The tray is symmetrical about a dividing axis that extends between the first and second ends of the tray. The first splice chip is disposed on the tray between the dividing line and the first side of the tray. The first spool arrangement is disposed on the tray between the dividing line and the first side of the tray. The first spool arrangement at least partially surrounds the first splice chip. The second splice chip is disposed on the tray between the dividing line and the second side of the tray. The second spool arrangement is disposed on the tray between the dividing line and the second side of the tray. The second spool arrangement at least partially surrounds the second splice chip. The cover protects internal cabling on the tray.

In certain examples, the first and second splice chips are removably fastened to the tray.

In certain implementations, the bottom of the tray defines a channel extending along the dividing axis between the first and second ends of the tray. In examples, the top of the tray includes a protruding section that extends along the dividing axis.

In certain examples, the cover defines holes for finger access. In certain examples, the cover latches to the tray.

In accordance with other aspects of the disclosure, a method of cabling a blade of a bladed chassis system includes removing the blade from a chassis through an open front of the chassis; routing a cable through a rear of the chassis and through the open front of the chassis; routing the cable to a rear of the blade; splicing the cable to the unconnectorized ends of a pigtail arrangement; and inserting the blade into the chassis through the open front after the cable is spliced to the pigtail arrangement.

In certain examples, the method also includes routing unconnectorized ends of optical pigtails of the pigtail arrangement to a splice chip disposed at a fiber module; and plugging connectorized ends of optical pigtails into rear ports of the optical adapters.

In certain examples, the cable is secured to the fiber module using a cable-tie.

In certain examples, the fiber module is attached to the blade without using tools.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
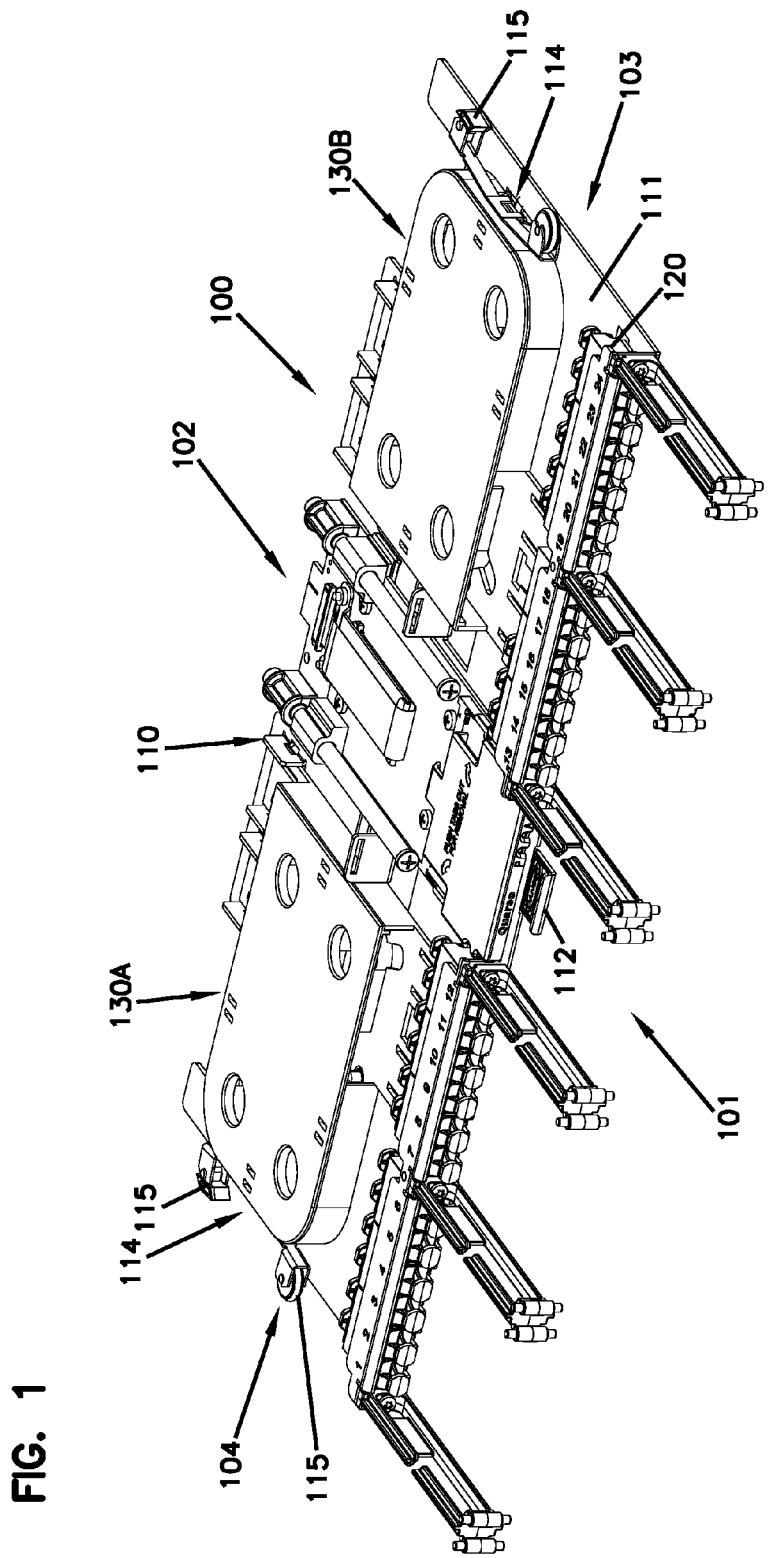
FIG. 1 is a perspective view of an example blade including two optical splice modules in accordance with the principles of the present disclosure.

The present disclosure relates generally to an optical splice module for use in optical bladed systems. For example, one or more of the optical splice modules can be disposed on a blade that can be received at a chassis. FIG. 1 illustrates a blade arrangement 100 for use in a bladed chassis system. The blade arrangement 100 includes a blade 110 and an optical splice module 130 coupled to the blade 110. The blade 110 includes a panel 111 extending between a front and a rear and between a first side and an opposite second side. The blade 110 includes one or more optical adapters 120 disposed on the panel 111. Each of the optical adapters 120 has a front-facing port 122 and a rear-facing port 124 (see FIG. 7). In certain implementations, a frame holds the optical adapters 120 to the blade 110.

The bladed chassis system is configured to enable the blades 110 to move relative to the chassis into one or more locked or otherwise identifiable positions. Moving one of the blades 110 to a different position relative to the other blades 110 in the chassis may aid a user in accessing the coupler ports of the blade 110 and/or any media segments inserted therein. A handle 112 extends from the front of the panel 111 to facilitate positioning of the blade 110 relative to a chassis. In certain examples, the blade 110 includes a retention arrangement 114 that has one or more stop members 115 resiliently movable relative to the panel 111.

Example blades 110 suitable for use with the fiber module 130 are described in U.S. Publication No. 2011/0267794 and U.S. Publication No. 2013/0163218, the disclosures of which are hereby incorporated herein by reference.

In accordance with some aspects, the blade 110 is configured to receive unterminated optical fibers. As will be discussed in more detail herein, the unterminated optical fibers can be spliced to optical fiber pigtails that have connectorized ends plugged into the rear-facing ports 124 of the optical adapters 120. The optical splices can be stored at the blade 110. For example, the optical splices can be stored in protective optical splice modules 130 mounted to the blade 110 (see FIG. 1).

Figure 2:
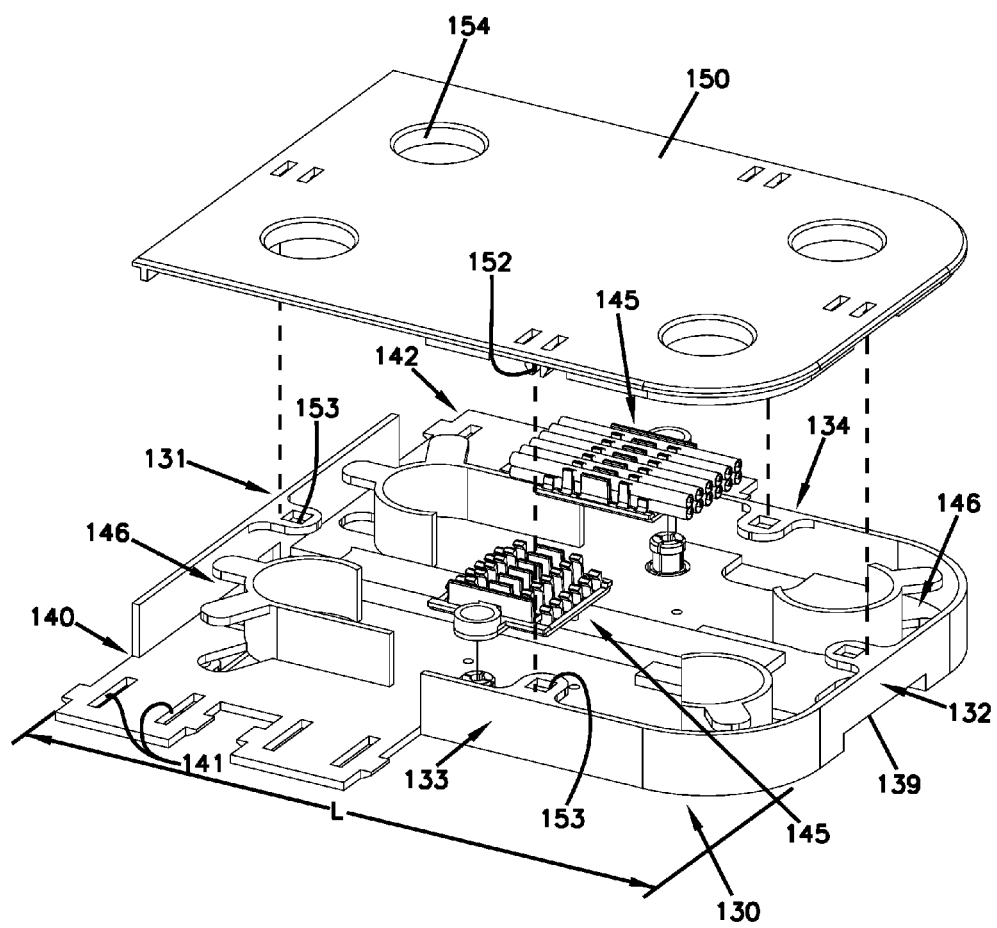
FIG. 2 is a perspective view of an example optical splice module with a cover and splice chips exploded from a tray.
Figure 3:
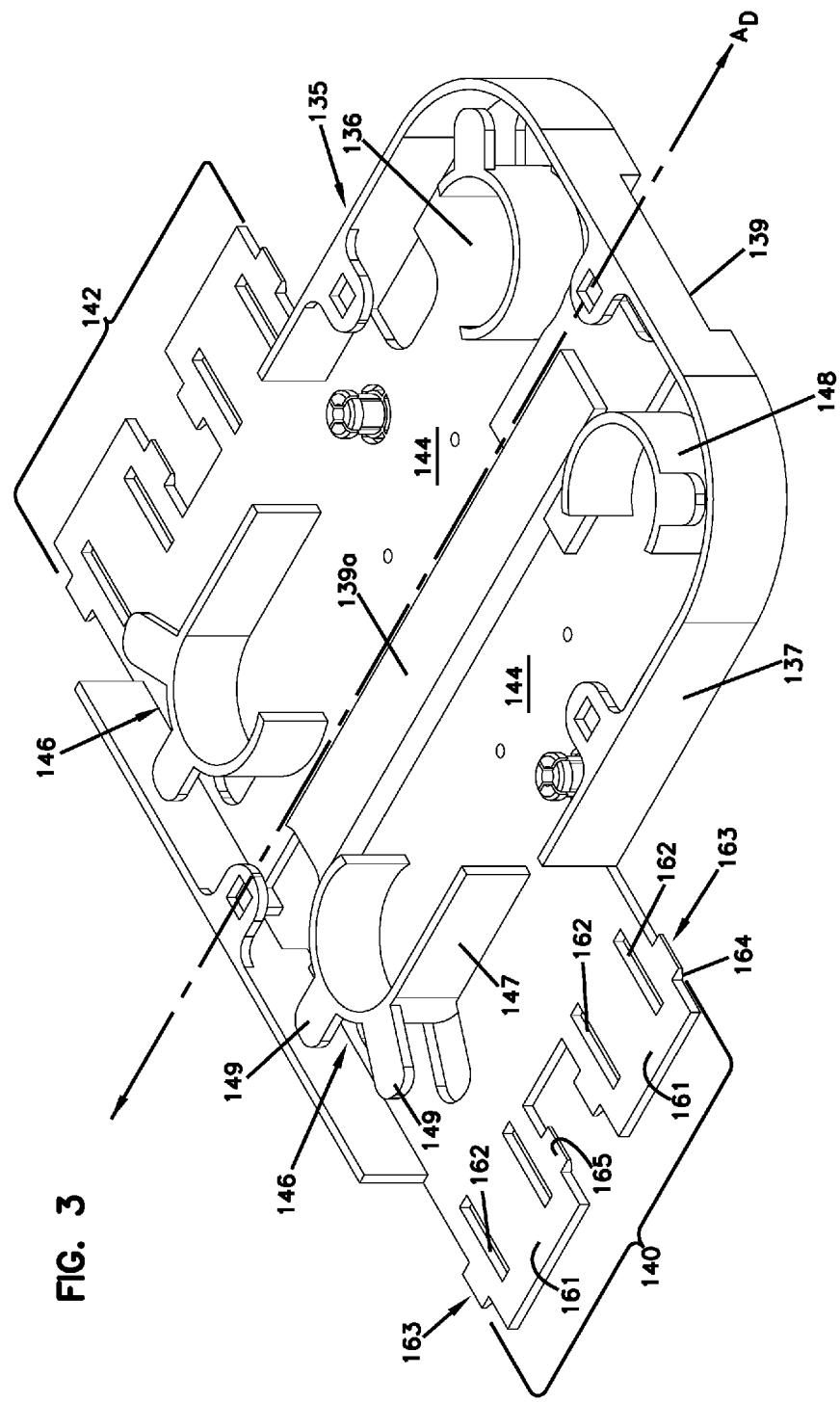
FIG. 3 is a top perspective view of the tray of the optical splice module of FIG. 2.
Figure 4:
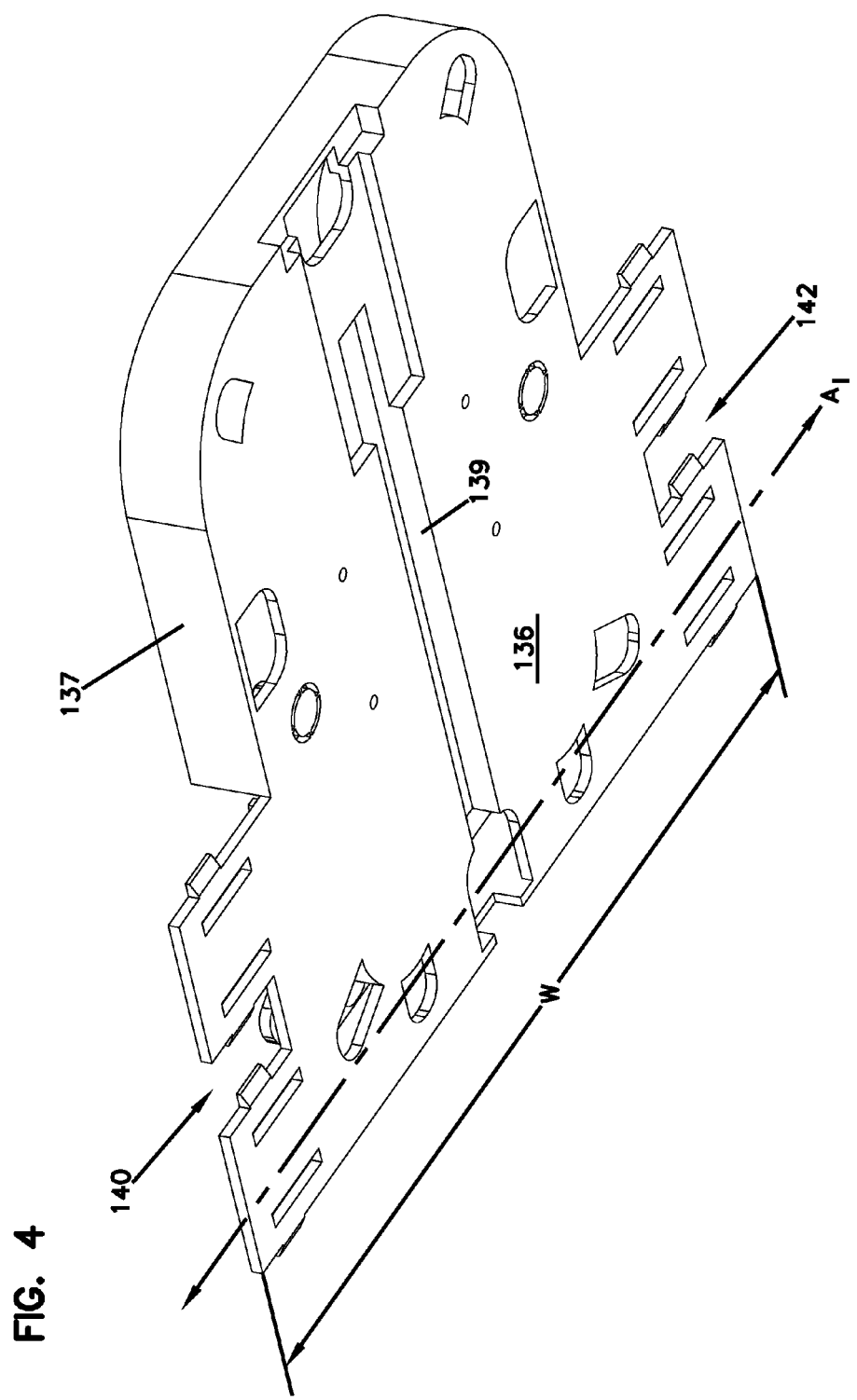
FIG. 4 is a bottom perspective view of the tray of the optical splice module of FIG. 2.

FIGS. 2-4 illustrate one example optical splice module 130 suitable to be coupled to the blade 110. The optical splice module 130 extends between first and second opposite ends 131, 132 and between first and second opposite sides 133, 134. The optical splice module including a splice region 144, a storage region 146, and a first enter/exit region 140 at the first side 133. In certain examples, the optical splice module 130 includes a second enter/exit region 142 at the second side 134. The first and second enter/exit regions 140, 142 are aligned along a fiber routing axis $A_I$ that extends between the first and second sides 133, 134 of the optical splice module 130.

In some implementations, the optical splice module 130 includes two splice regions 144 and two storage regions 146. For example, each storage region 146 can extend around one of the splice regions 144. In certain implementations, the optical splice module is symmetrical about a dividing axis $A_D$ that extends between the first and second ends 131, 132. In the example shown, the dividing axis $A_D$ is located about halfway between the first and second sides 133, 134.

The optical splice module 130 includes a tray 135 having a length L extending between the first and second ends 131, 132 of the optical splice module 130. The tray 135 also has a width W extending between the first and second sides 133, 134 of the optical splice module 130. The tray 135 includes a sidewall 137 extending upwardly from a base 136. The base 136 has a top (see FIG. 3) and a bottom (see FIG. 4). The sidewall 137 extends upwardly from the top of the base 136 to define an interior of the tray 135.

The sidewall 137 is interrupted along portions of the first and second sides 133, 134 to define first and second enter/exit regions 140, 142, respectively. The base 136 extends outwardly from the first and second sides 133, 134 of the tray 135 beyond the sidewall 137 at the first and second enter/exit regions 140, 142 to define cable securement locations. In the example shown, the first and second enter/exit regions 140, 142 are located at the first end wall 131. In other examples, the first and second enter/exit regions 140, 142 can be located at the second end wall 132 or at an intermediate location between the first and second end walls 131, 132. In still other examples, the first and second enter/exit regions 140, 142 can be laterally offset from each other.

A spool or bend radius limiter arrangement is disposed at the storage region 146. The spool or bend radius limiter arrangement enables one or more optical fibers to be wrapped therearound for storage. In the example shown, the bend radius limiter arrangement includes a first bend radius limiter 147 and a second bend radius limiter 148 spaced apart and facing away from each other. In certain examples, the first bend radius limiters 147 have an extended leg that extends partly across the respective enter/exit region 140, 142 (e.g., see FIG. 3). In certain examples, retention fingers 149 extend outwardly from the bend radius limiters 147, 148 to facilitate routing of the optical fibers on the tray 135.

A splice chip 145 is disposed at the tray 135 at the splice region 144. In certain implementations, the splice chip 145 can be releasably mounted (e.g., by fasteners) to the top of the tray base 136. For example, the splice region 144 can include a pem (see FIG. 3), a screw and screw hole, or other fastener structure that is configured to attach the splice chip 145 to the tray 135. In certain implementations, multiple splice chips 145 are disposed at the tray 135. In the example shown, a first of the splice chips 145 is disposed between the dividing axis $A_D$ and the first side 133 of the tray 135; a second of the splice chips 145 is disposed between the dividing axis $A_D$ and the second side 134 of the tray 135.

Figure 5:
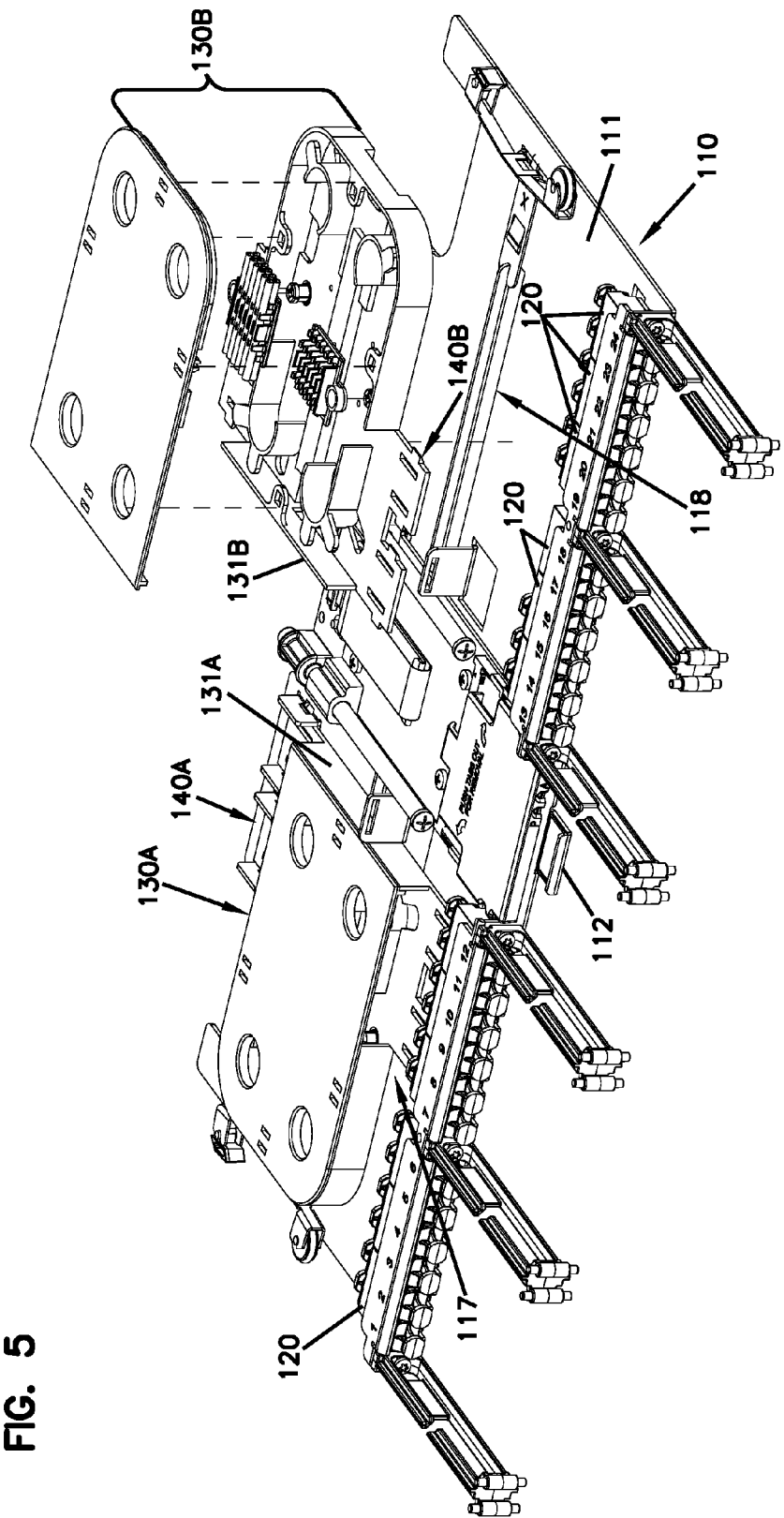
FIG. 5 is a perspective view of the blade of FIG. 1 with one of the optical splice modules exploded from the blade.

As shown in FIG. 5, the bottom of the tray base 136 defines a channel 139 extending along the dividing axis $A_D$ between the first and second ends 131, 132 of the tray 135. In some implementations, the channel 139 extends fully along the length L of the tray 135 between the first and second ends 131, 132. In other implementations, the channel 139 extends over only a portion of the length L. As shown in FIG. 3, a portion 139a of the base 136 is built up to accommodate the channel 139. For example, the portion 139 of the base 136 protrudes upwardly from the top of the base 136 in line with the channel 139. In certain examples, the protruding portion 139 of the base 136 does not extend to the periphery of the base 136 so that the protruding portion 139 does not interfere with the storage region 146. In the example shown, the storage region 146 extends around the protruding portion 139.

In some implementations, the optical splice module 130 includes a cover 150 that extends over the splice chip 145 and storage region 146. The cover 150 and tray 135 include a securement arrangement that releasably holds the cover 150 to the tray 135. For example, the cover 150 may include resilient fingers 152 that latch to retention members 153 that extend inwardly from the sidewall 137. In other examples, the cover can otherwise attach to the tray 135. In certain examples, the cover 150 defines finger openings 154 that facilitate removal and mounting of the cover 150.

As shown in FIG. 5, one or more optical splice modules 130 can be mounted to the blade 110. In accordance with some aspects of the disclosure, the optical splice module 130 is mountable to the blade 110 without using tools. For example, the optical splice module 130 can be mounted to the blade 110 without using a fastener (e.g., screw, rivet, etc.), a screwdriver, an Allen wrench, a mallet, or other tool. Rather, the optical splice module 130 can be latched, snap-fit, friction-fit, or otherwise toollessly attached to the blade 110. In other implementations, however, the optical splice module 130 can be fastened or otherwise attached to the blade 110 with tools.

In some implementations, the optical splice module 130 includes latching tabs 163 (e.g., see FIG. 3) that snap-fit into latching apertures 167 (e.g., see FIG. 6) on the base 110. In the example shown, the latching tabs 163 are disposed at the first enter/exit region 140. Each enter/exit region 140 includes one or more platforms 161 that extend outwardly from the base 136 past the sidewall 137. One or more latching tabs 163 extend outwardly from the platforms 161. In the example shown, the enter/exit regions 140 includes two platforms 161 from which two latching tabs 163 extend in opposite directions.

In certain examples, each latching tab 163 includes a ramped surface 164 and a catch surface 165. In certain examples, the catch surface 165 is coplanar with the top of the base 136. In certain examples, the ramped surface faces away from the top surface of the base 136. In certain examples, each latching tab 163 faces either towards the first end 131 or the second end 132 of the optical splice module 130. In certain examples, the base 110 includes mounting tabs 166 extend upwardly from the base 110. The mounting tabs 166 define the latching apertures 167 into which the latching tabs 163 fit. In certain examples, the base 110 includes two spaced apart mounting tabs 166 for each platform 161 at the first enter/exit region 140.

The optical splice module 130 is positioned at the blade 110 so that the platform 161 aligns between the two mounting tabs 166. As the optical splice module 130 is lowered onto the blade 110, the platform 161 passes between the two mounting tabs 166. The ramped surfaces 164 of the latching tabs 163 ride over to edges of the mounting tabs 166 and flex or otherwise deflect the mounting tabs 166 outwardly from the platform 161 until the latching tabs 163 enter the latching apertures 167. The catch surface 165 faces upwardly from the blade 110 and abuts an inner edge of the respective mounting tab 166 to hold the optical splice module 130 at the blade 110.

In certain implementations, the optical splice module 130 also may include a latching tab extending outwardly from the first and/or second end 131, 132 of the optical splice module 130. In certain examples, the optical splice module 130 may include a latching tab configured to engage a portion of the retention arrangement 114 of the blade 110. For example, the latching tab may extend beneath a bridge that extends over a portion of the retention arrangement 114.

FIGS. 9-12 illustrate another example optical splice module 230 (FIG. 12) suitable to be coupled to the blade 110. The optical splice module 230 is substantially the same as the optical splice module 130 except as described below. In some implementations, the optical splice module 230 includes latching arms 263 (e.g., see FIG. 10) that snap-fit into latching apertures 167 (e.g., see FIG. 6) on the base 110. One or more latching arms 263 extend outwardly from each platform 261 at the first and/or second enter/exit regions 240, 242. In the example shown, the enter/exit regions 240 includes two platforms 261 from which two latching arms 263 extend in opposite directions.

In certain examples, each latching arm 263 has a deflectable distal end having a ramped surface 264 and a catch surface 265. In certain examples, the catch surface 265 faces inwardly towards the base 236 of the module 230. In certain examples, the ramped surface 264 faces partially away from the platform 261 and partially away from the base 236. In certain examples, the distal ends of the latching arms 263 deflect inwardly towards the platforms 261 when the splice module 230 is mounted at the base 236. The ramped surfaces 264 cam over the mounting tabs 166 of the blade 110 until the catch surfaces 265 snap outwardly into the apertures 167 defined by the mounting tabs 166.

Accordingly, the latching arms 263 enable mounting the optical splice module 230 to the blade 110 without using tools. For example, the optical splice module 230 can be mounted to the blade 110 without using a fastener (e.g., screw, rivet, etc.), a screwdriver, an Allen wrench, a mallet, or other tool. Rather, the optical splice module 230 can be latched, snap-fit, friction-fit, or otherwise toollessly attached to the blade 110. In other implementations, however, the optical splice module 230 can be fastened or otherwise attached to the blade 110 with tools.

In some implementations, the splice module 230 also includes another catch member 269 extending outwardly from the sidewall 237 of the splice module 230. The catch member 269 defines a ramped surface facing partially downwardly and partially away from the splice module tray 235. The catch member 269 also defines a catch surface facing upwardly. The catch member 269 is configured to engage with one of the retention arrangements 114 of the blade 110 (see FIG. 12). For example, a portion of the retention arrangement 114 rides over the ramped surface of the catch member 269 until the catch surface of the catch member 269 snaps into an aperture defined by the retention arrangement 114.

Accordingly, in some implementations, the splice module 230 is mounted to the blade 110 using a sliding and pivoting motion. For example, the splice module 230 can be mounted to the blade 110 by sliding one of the enter/exit regions 240, 242 of the splice module 230 towards the tabs 166 of the blade 110 until the latching arms 263 latch to the tabs 166; and pivoting the splice module 230 towards the blade 110 until the catch member 269 engages with the retention arrangement 114.

Figure 6:
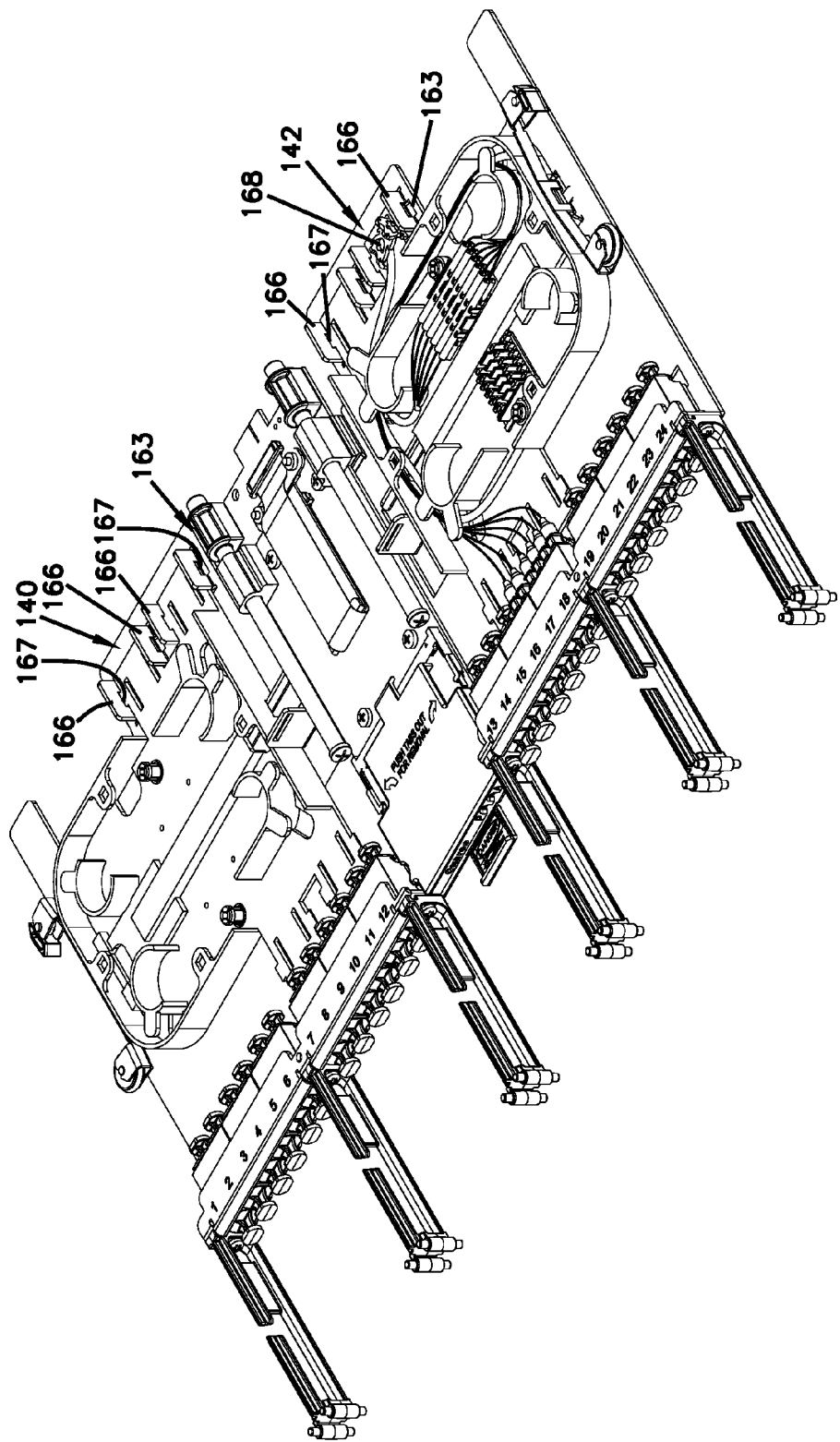
FIG. 6 is a perspective view of the blade of FIG. 1 with the covers removed from the optical splice modules.
Figure 7:
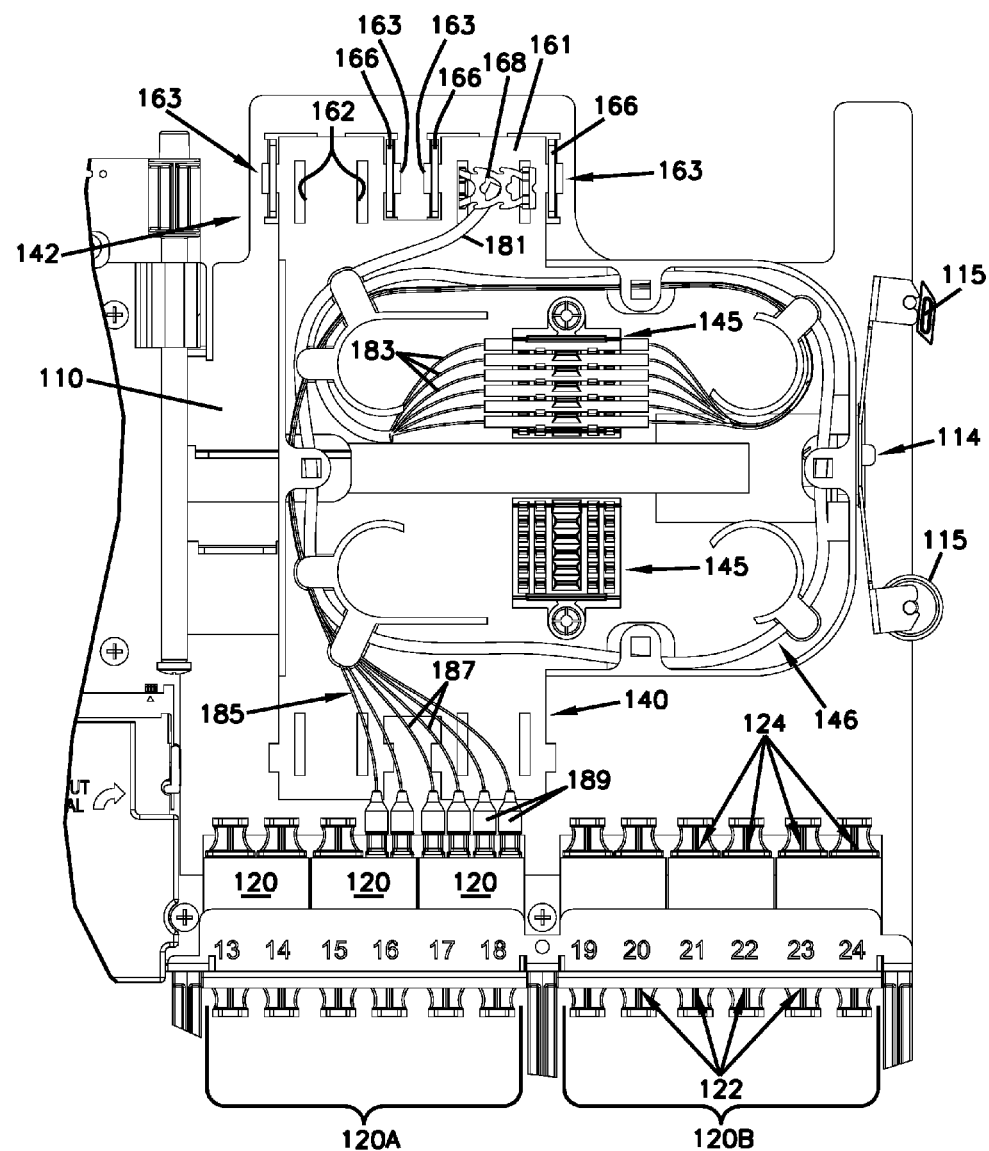
FIG. 7 is a top plan view of a portion of an example blade and an example optical splice module showing the splices between an example optical cable and an example pigtail arrangement in accordance with the principles of the present disclosure.
Figure 8:
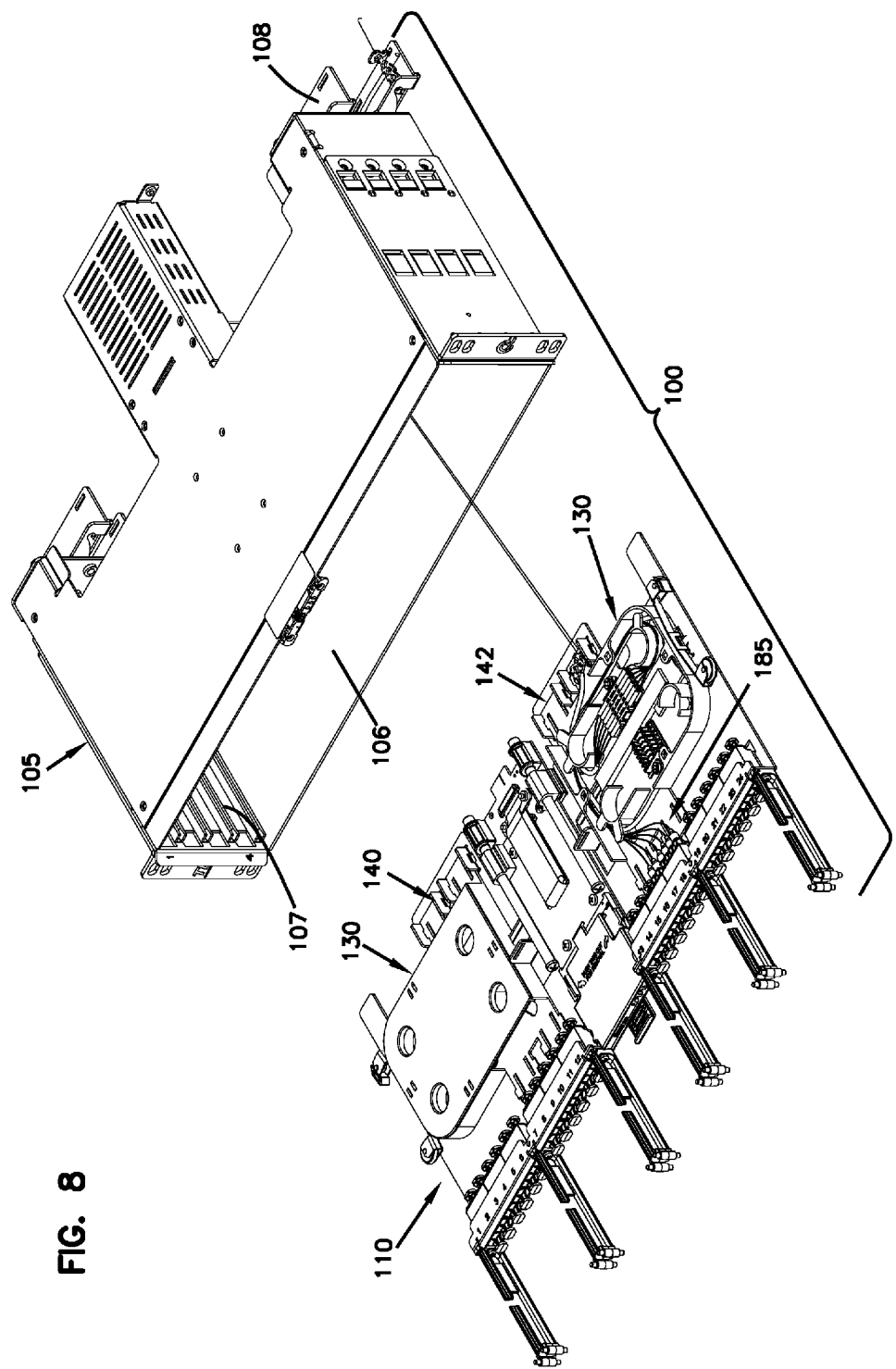
FIG. 8 is a perspective view of the blade disposed external of the chassis and an optical cable routed through the chassis to the blade for splicing in accordance with the principles of the present disclosure.
Figure 9:
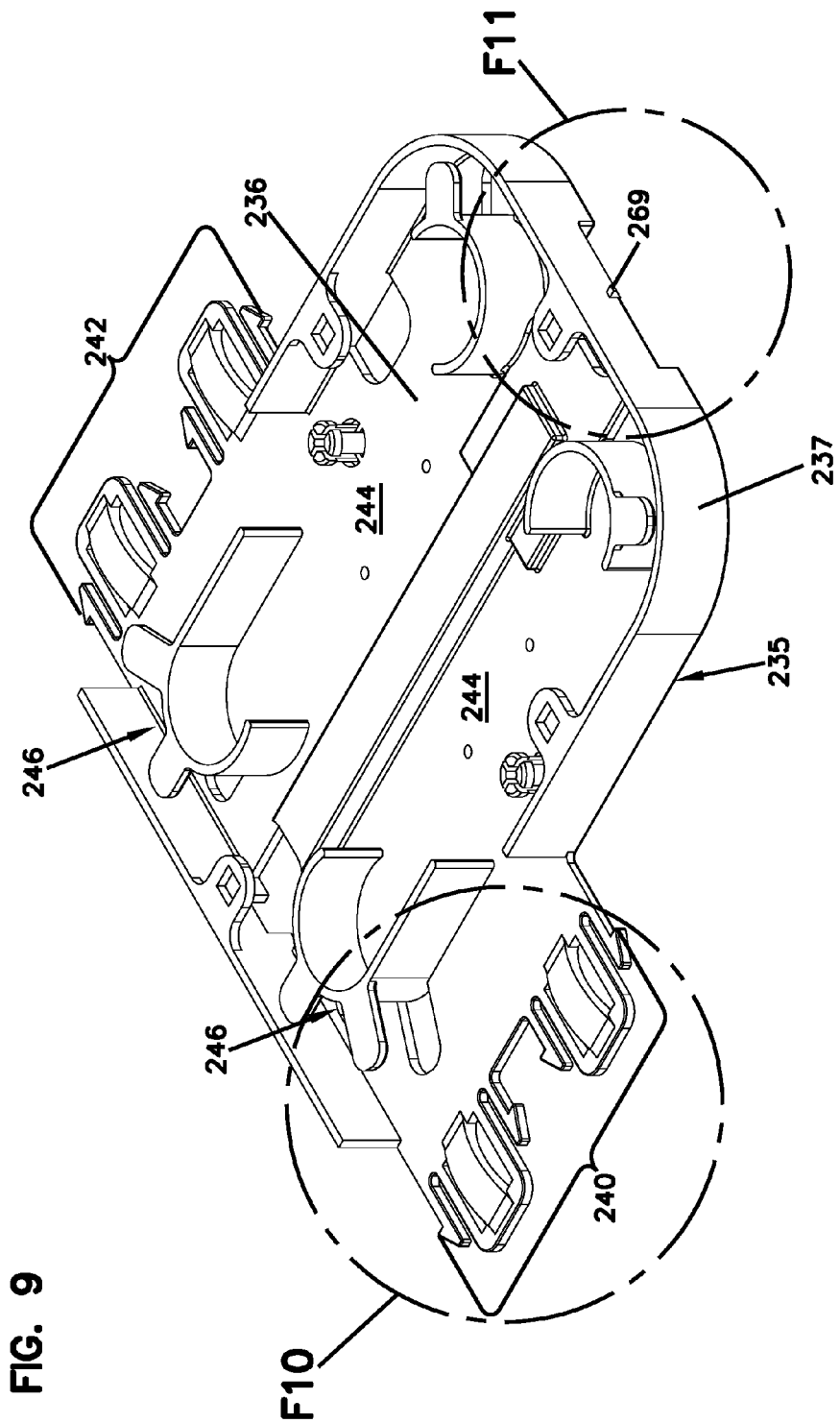
FIG. 9 is a top perspective view of an example tray of another example optical splice module.
Figure 10:
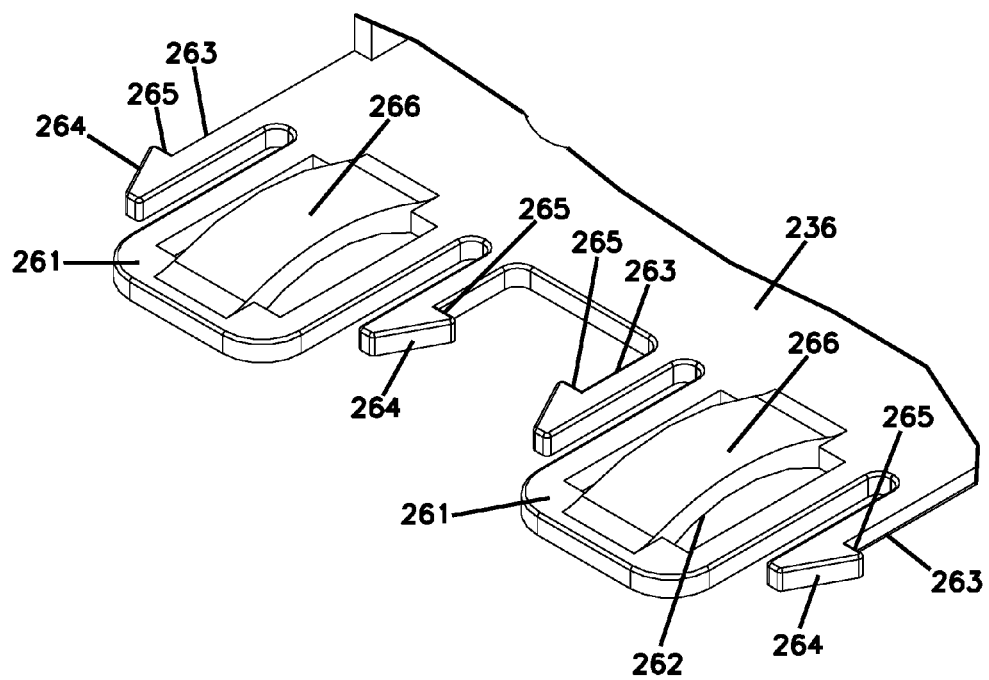
FIG. 10 is an enlarged view of a portion of FIG. 9.
Figure 11:
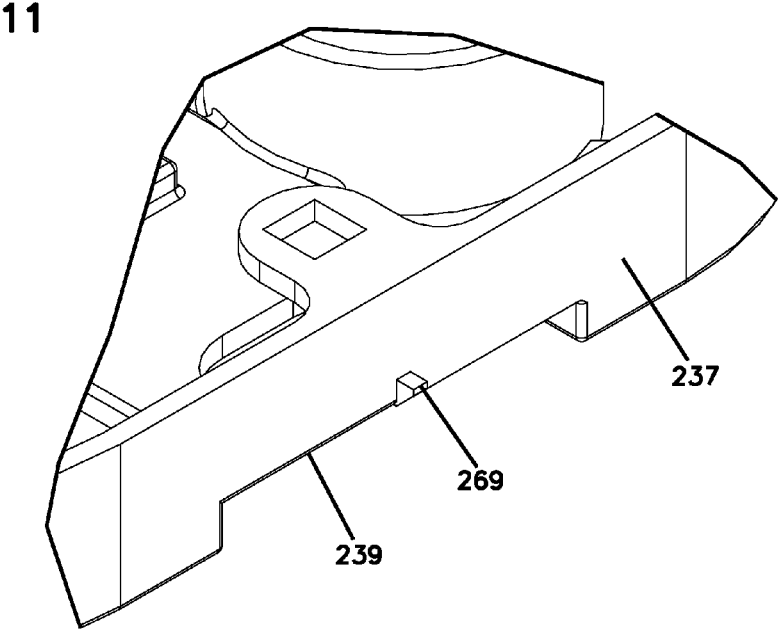
FIG. 11 is an enlarged view of another portion of FIG. 9.
Figure 12:
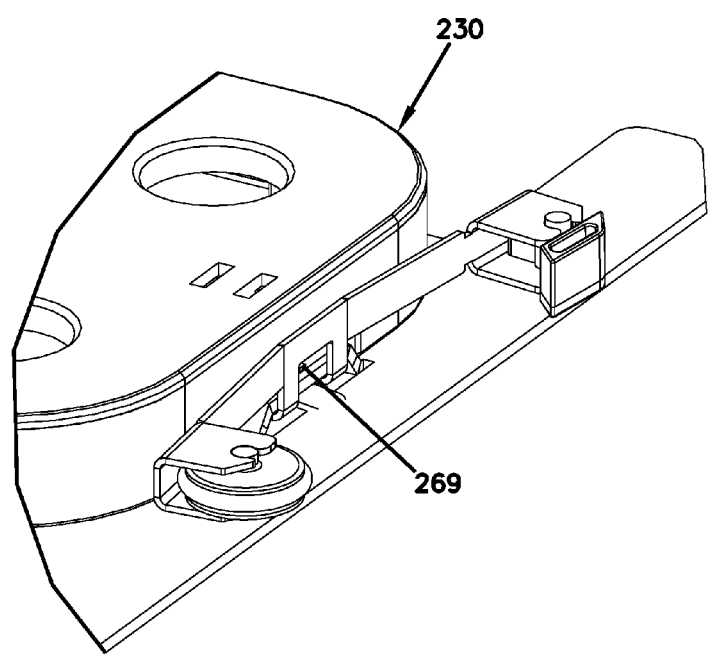
FIG. 12 is an enlarged view of the tray of FIG. 9 mounted to the blade of FIG. 1.

As shown in FIGS. 6-8, the optical splice module 130, 230 is mounted so that one of the enter/exit regions 140, 240 is disposed at the rear of the blade 110. Accordingly, one or more optical cables 180 can be routed to the rear of the blade 110 and onto the optical splice module 130, 230 through one of the enter/exit regions 140, 142, 240, 242. In some implementations, the blade 110 is configured to secure the optical cable 180 to the blade 110. For example, the blade 110 may define apertures for a zip-tie, lacing, or other securement member.

In other implementations, the splice module 130, 230 is configured so that the cable 180 can be secured to the splice module 130, 230. For example, the platform 161, 261 can define apertures 162, 262 through which a zip-tie 168 or other securement member (FIG. 7) can pass to hold the cable 180 to the splice module 130, 230. In the example shown in FIG. 10, the platform 261 includes a curved section or other upward extension that partially defines the apertures 262. The zip-tie 168 or other securement member encircles the cable 180 and the curved section to hold the cable 180 to the splice module 230. Accordingly, the curved section enables the zip tie 168 or other securement member to pass between the splice module 230 and the blade 110, thereby maintaining the zip tie 168 or other securement member within an outer periphery of the blade 110.

As shown in FIG. 7, the optical cable 180 can be routed from the enter/exit region 140, 142, 240, 242 to the storage region 146, 246. From the storage region 146, 246, the optical cable 180 can be routed to the splice chip 145 at the splice region 144, 244. In certain implementations, each optical cable 180 includes one or more optical fibers 183 surrounded by a jacket 181. The jacketed portion of the cable 180 can be secured to the optical splice module 130, 230 at the enter/exit region 140, 142, 240, 242. The optical fibers 183 can be separated out at the splice chip 145.

In certain implementations, the optical fibers 183 can be optically spliced (e.g., fusion spliced, mechanically spliced, etc.) to first ends of optical fibers 187 of a pigtail arrangement 185. The second ends of the optical fibers 187 can be terminated at optical connectors 189 that are plugged into the rear ports 124 of the optical adapters 120 on the blade 110. In certain examples, portions of the pigtail optical fibers 187 can be routed through the storage region 146, 246 of the optical splice module 130, 230.

In some implementations, the optical splice module 130, 230 includes multiple splice chips 145. In certain examples, each splice chip 145 services the optical fibers 183 of one cable 180. In other examples, the optical fibers 183 of multiple cables 180 can be routed to the same splice chip 145. In the example shown in FIG. 7, a first splice chip 145 holds optical splices to connectorized pigtails 187 plugged into the rear ports 124 of a first group 120A of optical adapters 120. A second splice chip 145 is configured to hold optical splices to connectorized pigtails 187 plugged into the rear ports 124 of a second group 120B of optical adapters 120.

In some examples, the optical pigtail arrangement 185 can be pre-cabled on the optical module 130, 230 at the factory. In other examples, the optical pigtail arrangement 185 is cabled between the splice chip 145 and the adapters 120 when the optical module 130, 230 is installed on the blade 110. In still other examples, the optical pigtail arrangement 185 is cabled between the splice chip 145 and the adapters 120 when the optical cable 180 is routed to the blade 110.

In accordance with aspects of the disclosure, the optical splice module 130 is configured to be positioned on the blade 110 so that either the first enter/exit region 140, 240 or the second enter/exit region 142, 242 is disposed at the rear of the blade 110. Accordingly, in certain implementations, the first enter/exit region 140, 240 is identical to the second enter exit region 142. Both enter/exit regions 140, 142, 240, 242 include platforms 161 from which latching tabs 163 extend.

As shown in FIG. 5, a first optical splice module 130A can be installed at a first location 117 and a second optical splice module 130B can be installed at a second location 118. In certain implementations, the first optical splice module 130A is disposed in a first orientation that is rotated about 180° from a second orientation of the second optical splice module 130B. For example, the first end 131A of the first optical splice module 130A may face the first end 131B of the second optical splice module 130B. The first enter/exit region 140 of the first optical splice module 130A and the second enter/exit region 142 of the second optical splice module 130B are disposed at the rear of the blade 110. In examples, the first location 117 is disposed between the first side of the blade panel 111 and a central part of the panel 111; the second location 118 is disposed between the second side of the panel 111 and the central part of the panel 111. In other examples, first and second optical splice modules 230 could be utilized instead.

In some implementations, only the rear-facing enter/exit region 140, 142, 240, 242 of each optical splice module 130, 230 is attached to the base 110. For example, the forward facing enter/exit region can seat on the blade 110 without a structure trapping the catch surface 165 of the latching tabs 163 (e.g., see FIG. 7) or catch surface 265 of latching arms 263. In other implementations, the blade 110 may include structure to interact with the latching tabs 163 or latching arms 263 on the forward-facing enter/exit region 140, 142, 240, 242.

As shown in FIG. 8, the blade arrangement 100 also includes a chassis 105 defining an interior 106 is which the blade 110 can be positioned. For example, the chassis 105 can include guides 107 disposed within the interior 106 along which the blade 110 can slide. In other examples, the blade 110 may be otherwise positioned within the interior 106. In certain examples, the chassis 105 includes one or more anchor stations 108 at the rear of the chassis 105 to secure optical cables 180 routed to the rear of the chassis 105.

As shown in FIG. 8, a blade 110 can be cabled by removing the blade 110 from the chassis 105, routing the optical cable 180 to the rear of the blade 110; routing the optical cable 180 onto an optical splice module 130, 230 on the blade 110; and splicing the optical fibers 183 of the cable 180 to connectorized pigtails 187 on the optical splice module 130, 230. The optical splices are stored and protected at a splice chip 145 disposed on the optical splice module 130, 230.

In some implementations, the blade 110 is removed from the chassis 105 by moving the blade 110 through an open front of the chassis 105. In certain implementations, the cable 180 is routed into the chassis interior 106 from the rear and out of the chassis interior 106 through the front of the chassis 105 to reach the rear of the blade 110. Accordingly, when the optical splices have been made, the blade 110 can be moved into the chassis interior 106 through the front of the chassis 105 and the cable 180 can be secured to the chassis 105 at an anchor station 108.

FIGS. 13-16 illustrate another example optical splice module 300 suitable to be coupled to the blade 110. The optical splice module 300 extends between first and second opposite ends 301, 302 and between first and second opposite sides 303, 304. The optical splice module including a splice region 310, a storage region 320, and a first enter/exit region 330 at the first side 303. In certain examples, the optical splice module 300 includes a second enter/exit region 340 at the second side 304. The first and second enter/exit regions 330, 340 are aligned along a fiber routing axis $A_J$ that extends between the first and second sides 303, 304 of the optical splice module 300.

In certain implementations, the splice region 310 of the optical splice module 300 is divided into a first splice section 310A and a second splice section 310B. In some implementations, the first splice section 310A and second splice section 310B are located adjacent each other. In other implementations, the first splice section 310A can be spaced across the splice module 300 from the second splice section 310B. In certain implementations, a single storage region 320 is associated with both the first and second splice sections 310A, 310B.

In certain implementations, the splice module 300 includes routing channels 350 extending between the opposite ends 301, 302 of the splice module 300. In certain implementations, the routing channels 350 extend between the splice region 310 and the storage region 320. In certain implementations, the routing channels 350 extend between the splice region 310 and the enter/exit region(s) 330, 340. In certain implementations, the routing channels 350 extend between the storage region 320 and the enter/exit region(s) 330, 340. In certain implementations, the routing channels 350 extend between the splice region 310, the storage region 320, and the enter/exit region(s) 330, 340.

In certain implementations, the optical splice module is symmetrical about a dividing axis $A_E$ that extends between the first and second ends 301, 302. In the example shown, the dividing axis $A_E$ is located about halfway between the first and second sides 303, 304. In certain implementations, the dividing axis $A_E$ extends through the splice region 310 and the storage region 320. In certain implementations, the dividing axis $A_E$ extends transverse to the fiber routing axis A. In certain implementations, the first enter/exit region 330 is disposed at one side 303 of the dividing axis $A_E$ and the second enter/exit region 340 is disposed at the other side 304 of the dividing axis $A_E$.

The optical splice module 300 includes a tray 305 having a length extending between the first and second ends 301, 302 of the optical splice module 300. The tray 305 also has a width W extending between the first and second sides 303, 304 of the optical splice module 300. In certain implementations, the tray 305 includes a raised platform 306 extending along the length of the tray 305. In certain implementations, the splice region 310 is located on the raised platform 306. In certain implementations, the storage region 320 is located on the raised platform 306. In certain implementations, the routing channels 350 extend over the tray 305 along sides of the raised platform 306.

In some implementations, the splice module 300 can be securely seated on the blade panel 111. In some implementations, the splice module 300 can be taped to the blade panel 111. In other implementations, the splice module 300 can be latched to the blade panel 111. In certain implementations, the splice module 300 can include guide members 309 that facilitate locating the splice module 300 on the blade panel 111. For example, certain types of splice modules 300 can include guide members 309 extending downwardly from the raised platform 306 into a cavity 307 defined below the raised platform 306. For example, two curved flanges 309 can extend downwardly from the platform 306.

Structure on the blade panel 111 can extend through the cavity 307 and between the guide members 309. For example, the blade 110 can include a flange 170 extending upwardly from the blade panel 111. In certain implementations, the splice module 300 can be positioned on the blade panel 111 so that the flange 170 extends through the cavity 307. In certain examples, the splice module 300 is positioned on the blade panel 111 so that guide members 309 extend on opposite sides of the flange 170. In certain examples, the flange 170 defines one or more apertures 175 (FIG. 15) through which one or more tabs of the splice module 300 can latch.

In certain implementations, the splice module 300 includes sidewalls 352 that extend upwardly from the tray 305 to aid in defining the routing channels 350. In certain implementations, a lip 354 extends inwardly from the sidewalls 352. In some implementations, the sidewalls 352 extend along the length of the tray 305. In other implementations, the sidewalls 352 stop at the first and second entrance/exit regions 330, 340. In certain examples, a retention finger 334 extends at least partially over each entrance/exit region 330, 340. In the example shown, the retention finger 334 extends longitudinally outwardly from the lip 354.

In some implementations, the entrance/exit regions 330, 340 can be located at the first end 301 and/or the second end 302 of the splice module 300. In certain implementations, the splice module 300 includes boundary walls 336 at the entrance/exit regions 330, 340 to aid in maintaining optical fibers within the splice module 300. For example, the boundary walls 336 may extend upwardly from the tray 305 at the first end 301 and/or the second end 302 of the splice module 300. Optical fibers enter the splice module by passing through a gap between the sidewall 352 and the boundary wall 334. In the example shown, boundary walls 336 are provided at only the first side 301 of the splice module 300.

In certain implementations, the splice module 300 includes end walls 308 at the ends 301, 302. For example, a first end wall 308 and a second end wall 308 may extend upwardly from the raised platform 306. Each end wall 308 may be configured to maintain optical fibers on the splice module 300.

Certain types of splice modules 300 include a cover 360 that extends over the tray 305 and raised platform 306. The cover 360 can be removably coupled to the end walls 308. For example, the cover 360 may include outwardly extending tabs 361 sized to fit within apertures 362 defined by the end walls 308. In other examples, the end walls 308 can define latch arms that snap to portions of the cover 360. In certain examples, one or more tabs 361 of the cover 360 are disposed at a flexible section 363 of the cover 360 to facilitate inserting the tab 361 through the corresponding aperture 362. In certain examples, the cover 360 can include alignment members 367 (e.g., posts, holes, etc.) configured to mate with alignment members of the tray 305 and/or platform 306 to facilitate positioning the cover 360.

Figure 16:
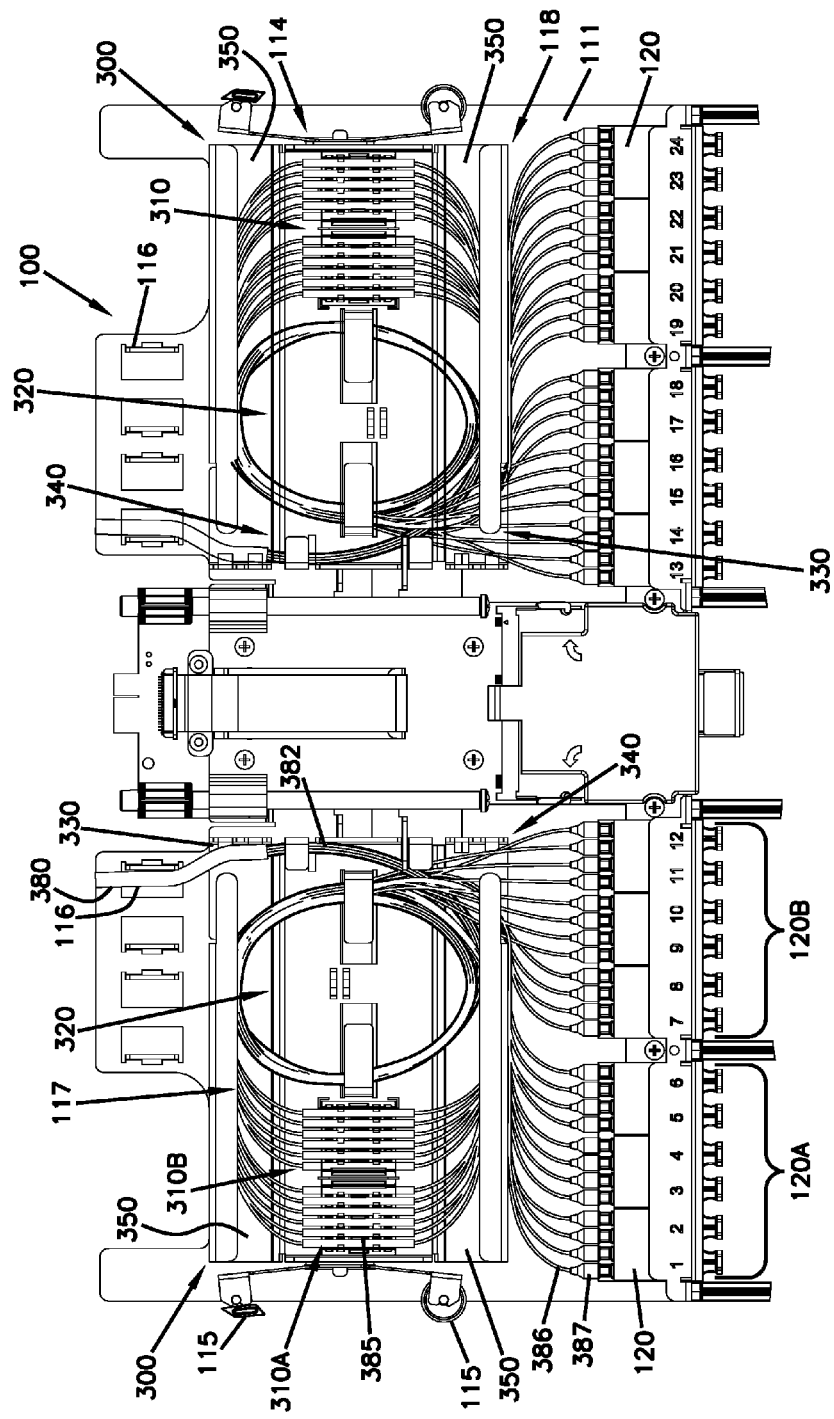
FIG. 16 is a top plan view of a portion of an example blade and an example optical splice module showing the splices between an example optical cable and an example pigtail arrangement in accordance with the principles of the present disclosure.

The storage region 320 is configured to store optical fibers. In some implementations, a spool or bend radius limiter arrangement is disposed at the storage region 320. In other implementations, a retention arrangement 325 enables optical fibers to be coiled in a loop and held at the storage region 320. In the example shown, the retention arrangement 325 includes two retention members spaced apart and facing each other. As shown in FIG. 16, a coil of fibers can be positioned between the two retention members. In still other implementations, the storage region 320 can include both a bend radius limiter arrangement (or spool arrangement) and retention arrangement 325.

A splice chip 315 is disposed at the splice region 310. In certain implementations, the splice chip 315 can be releasably mounted (e.g., by fasteners) to the raised platform 306. For example, the splice region 310 can include a pem, a screw and screw hole, or other fastener structure that is configured to attach the splice chip 315 to the splice region 310. In certain implementations, multiple splice chips 315 are disposed at the splice region 310. In the example shown, two splice chips 315 are disposed along the dividing axis $A_E$.

As shown in FIG. 16, a fiber optic cable 380 can be routed onto the blade 110 from the rear. The cable 380 can be routed onto the splice module 300 through either the first entrance/exit region 330 or the second entrance/exit region 340.

The optical cable 380 can be routed from the enter/exit region 330, 340, to the storage region 320. From the storage region 320, the optical cable 380 can be routed to a splice chip 315 at the splice region 310. In certain implementations, the optical cable 380 includes one or more optical fibers 382 surrounded by a jacket. The jacketed portion of the cable 380 can be secured to the blade panel 111 at an anchor location 116. The optical fibers 382 can be separated out at the splice chip 315.

In certain implementations, the optical fibers 382 can be optically spliced (e.g., fusion spliced, mechanically spliced, etc.) to first ends of pigtail optical fibers 386. The second ends of the pigtail optical fibers 386 can be terminated at optical connectors 387 that are plugged into the rear ports 124 of the optical adapters 120 on the blade 110. In certain examples, portions of the pigtail optical fibers 386 can be routed through the storage region 320 of the optical splice module 300.

In some implementations, the optical splice module 300 includes multiple splice chips 315. In certain examples, each splice chip 315 services the optical fibers 382 of one cable 380. In other examples, the optical fibers 382 of multiple cables 380 can be routed to the same splice chip 315. In the example shown in FIG. 16, a first splice chip 315 holds optical splices to connectorized pigtails 386 plugged into the rear ports 124 of a first group 120A of optical adapters 120. A second splice chip 315 is configured to hold optical splices to connectorized pigtails 386 plugged into the rear ports 124 of a second group 120B of optical adapters 120.

In some examples, the optical pigtails 386 can be pre-cabled on the optical splice module 300 at the factory. In other examples, the optical pigtails 386 are cabled between the splice chip(s) 315 and the adapters 120 when the optical splice module 300 is installed on the blade 110. In still other examples, the optical pigtails 386 are cabled between the splice chip 315 and the adapters 120 when the optical cable 380 is routed to the blade 110.

In accordance with aspects of the disclosure, the optical splice module 300 is configured to be positioned on the blade 110 so that either the first enter/exit region 330 or the second enter/exit region 340 is disposed at the rear of the blade 110. Accordingly, in certain implementations, the first enter/exit region 330 is identical to the second enter exit region 340.

Figure 13:
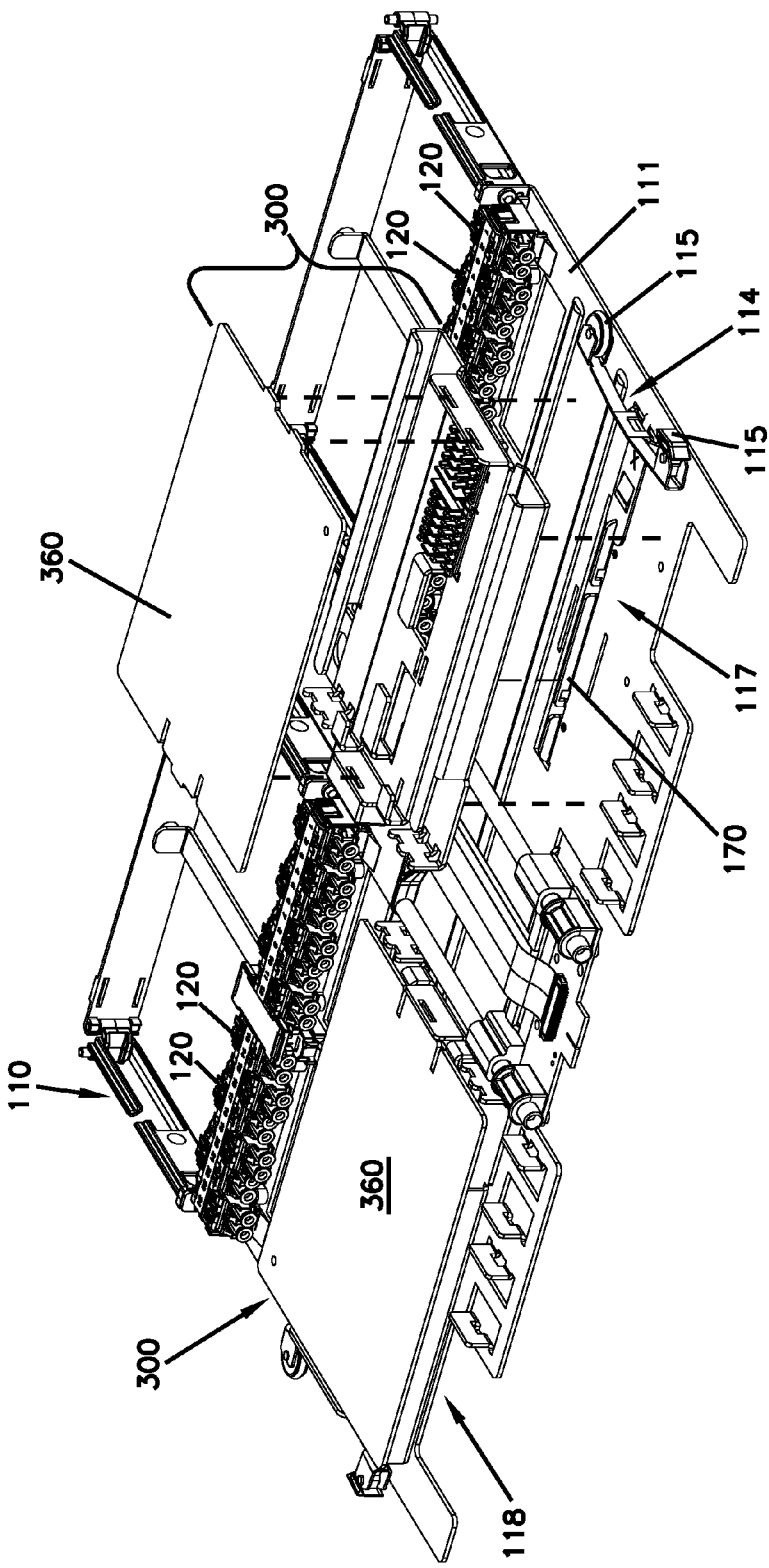
FIG. 13 is a perspective view of the blade of FIG. 1 carrying another type of optical splice modules with one of the example optical splice modules exploded from the blade.
Figure 14:
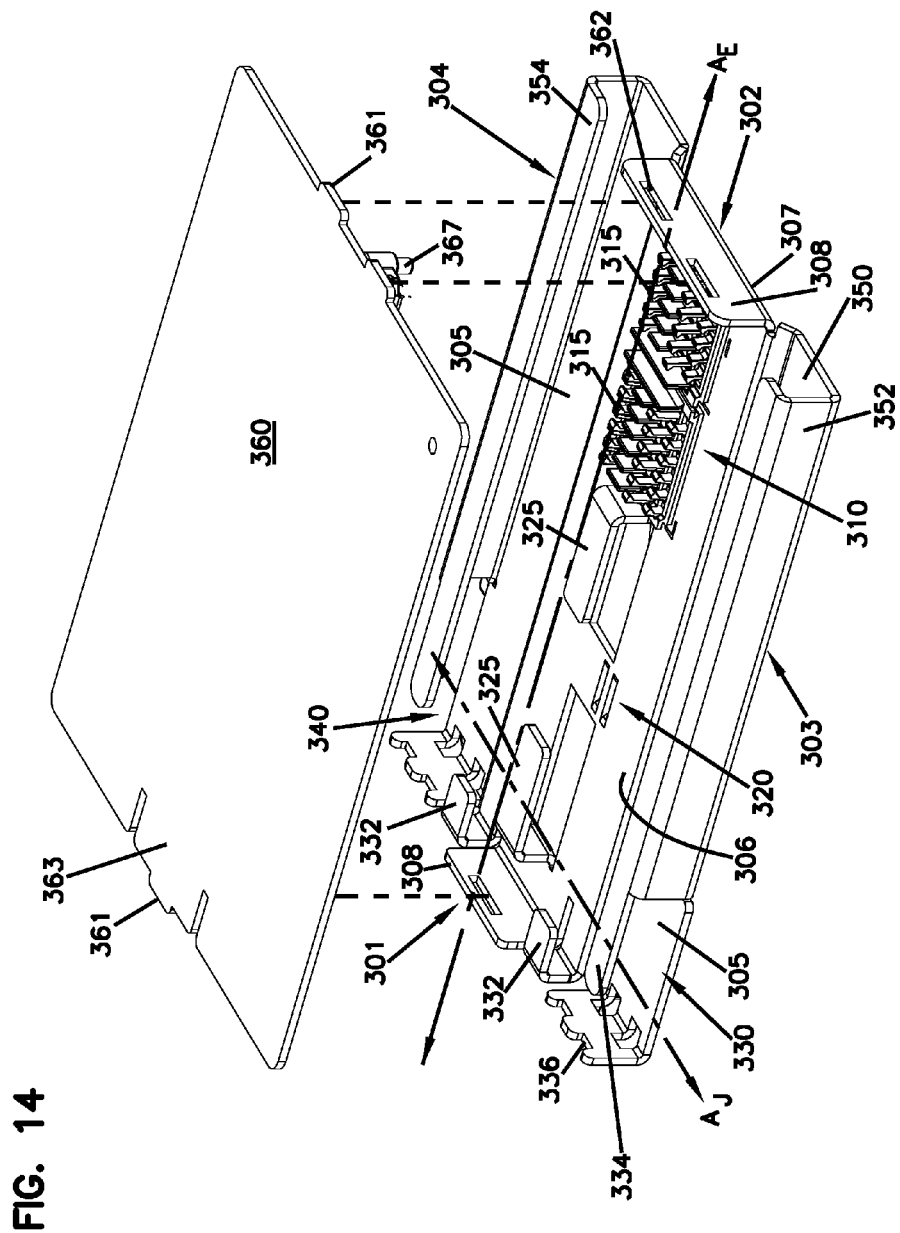
FIG. 14 is an enlarged view of the exploded optical splice module of FIG. 13.
Figure 15:
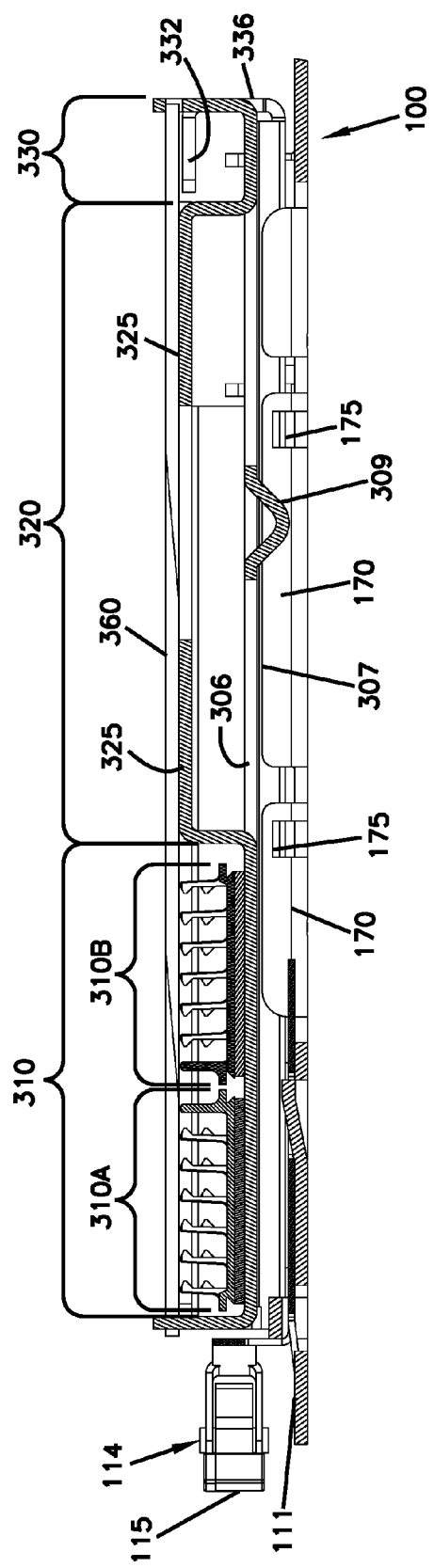
FIG. 15 is a cross-sectional view of the blade and one of the assembled optical splice module of FIG. 13 taken along a dividing axis.

As shown in FIGS. 13 and 16, a first optical splice module 300 can be installed at a first location 117 and a second optical splice module 300 can be installed at a second location 118. In certain implementations, the first optical splice module 300 is disposed in a first orientation that is rotated about 180° from a second orientation of the second optical splice module 300. For example, the first end 301 of the first optical splice module 300 may face the first end 301 of the second optical splice module 300. The first enter/exit region 330 of the first optical splice module 300 and the second enter/exit region 340 of the second optical splice module 300 are disposed at the rear of the blade 110. In examples, the first location 117 is disposed between the first side of the blade panel 111 and a central part of the panel 111; the second location 118 is disposed between the second side of the panel 111 and the central part of the panel 111.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A blade arrangement for use in a bladed chassis system, the blade arrangement comprising:
    a blade including a panel extending between a front and a rear and between a first side and an opposite second side, the blade including a plurality of optical adapters disposed on the panel, each of the optical adapters having a front-facing port and a rear-facing port, the blade also including a retention arrangement having a stop member resiliently movable relative to the panel; and
    a fiber module coupled to the blade, the fiber module extending between first and second opposite ends and between first and second opposite sides, the fiber module including a splice region, a storage region, a first enter/exit region at the first side, and a second enter/exit region at the second side, the first and second enter/exit regions being aligned along a fiber routing axis that extends between the first and second sides of the fiber module.

2. The blade arrangement of claim 1, wherein the fiber module is symmetrical about a dividing axis that extends between the first and second ends.

3. The blade arrangement of claim 1, wherein the fiber module is mountable to the panel without using tools.

4. The blade arrangement of claim 3, wherein the fiber module is configured to snap onto the panel.

5. The blade arrangement of claim 1, wherein the fiber module is shaped and configured to selectively mount to the blade at the first location or a second location, the first location being disposed between the first side of the panel and a central part of the panel, and the second location being disposed between the second side of the panel and the central part of the panel.

6. The blade arrangement of claim 5, wherein the fiber module is positioned in a first orientation when mounted at the first location and is positioned in a second orientation when mounted at the second location, the second orientation being rotated by about 180° compared to the first orientation.

7. The blade arrangement of claim 6, wherein the fiber module is a first fiber module held at the first location and wherein the blade further comprises a second fiber module that is identical to the first fiber module, the second fiber module being coupled to the blade at the second location, the first fiber module being positioned in the first orientation and the second fiber module being positioned in the second orientation.

8. The blade arrangement of claim 5, wherein the first enter/exit region is defined by a first platform and wherein the second enter/exit region is defined by a second platform, wherein one of the platforms is retained by the blade, wherein the second platform is not retained by the blade when the first platform is retained by the blade; and wherein the first platform is not retained by the blade when the second platform is retained by the blade.

9. The blade arrangement of claim 8, wherein the blade defines a cable tie location including mounting members extending upwardly from the panel, each mounting member defining an opening.

10. The blade of claim 9, wherein each platform of the fiber module has outwardly extending latching tabs that are sized and shaped to snap into the openings defined by the mounting members when the platform is retained by the blade.

11. The blade of claim 9, wherein each platform includes two latching arms having deflectable distal ends that are sized and shaped to snap into the openings defined by the mounting members when the platform is retained by the blade.

12. The blade of claim 1, wherein each of the first and second enter/exit regions includes an outwardly extending section below which a securement member can extend to secure a cable to the fiber module.

13. The blade arrangement of claim 1, further comprising optical fiber pigtails having first connectorized ends received at the rear-facing ports of the optical adapters, the optical fiber pigtails have second unconnectorized ends received at the fiber module.

14. The blade arrangement of claim 2, wherein the splice region and the storage region are disposed along the dividing axis.

15. The blade arrangement of claim 14, wherein a first routing channel extends between the splice region and the first enter enter/exit region; and wherein a second routing channel extends between the splice region and the second enter/exit region.

16. The blade arrangement of claim 14, wherein the splice region and the storage region are disposed on a raised platform that extends along the dividing axis.

17. The blade arrangement of claim 16, wherein guide members extend downwardly from the raised platform.

18. The blade arrangement of claim 1, wherein the fiber module is configured to be taped to the blade.

19. The blade arrangement of claim 1, wherein a cover is configured to removably couple to the fiber module to cover the splice region and storage region.

* * * * *